United States Patent [19]

Moss et al.

[11] 4,197,988

[45] Apr. 15, 1980

[54] APPARATUS FOR READING AND WRITING DATA ONTO A MAGNETIC STRIPE AND IN AN ARCUATE PATH

[75] Inventors: Charles A. Moss, Lee's Summit, Mo.; Leon J. Shaneyfelt, Jr., Overland Park, Kans.; Charley W. Hunter, Raytown, Mo.

[73] Assignee: The Vendo Company, Overland Park, Kans.

[21] Appl. No.: 839,639

[22] Filed: Dec. 2, 1977

[51] Int. Cl.² .................... G06K 7/08; G07F 7/08; G11B 25/04
[52] U.S. Cl. .................................. 235/449; 360/2; 235/381
[58] Field of Search .................... 360/2, 75, 81–84; 235/379–382, 449, 486, 493, 482; 250/569; 340/149 A; 194/4 F

[56] References Cited

U.S. PATENT DOCUMENTS

| 2,924,668 | 2/1960 | Hoshino | 360/2 |
| 2,986,609 | 5/1961 | Hoshino | 360/81 |
| 3,657,521 | 4/1972 | Constable | 235/382 |
| 3,665,119 | 5/1972 | Palmer | 235/449 |
| 3,787,661 | 1/1974 | Moorman | 360/2 |
| 3,850,426 | 11/1974 | Blair | 235/482 |
| 3,946,438 | 3/1976 | Altmann | 235/482 |
| 3,976,858 | 8/1976 | Haun | 235/482 |
| 4,011,433 | 3/1977 | Tateisi | 235/381 |

Primary Examiner—Robert M. Kilgore
Attorney, Agent, or Firm—Lowe, Kokjer, Kircher, Wharton & Bowman

[57] ABSTRACT

This invention discloses a magnetic stripe card reader/writer apparatus comprising a card reader/writer device and a basic interface circuit. The recording head of the card reader/writer device is mounted on the end of a sensor arm and is driven over the magnetic stripe in an arcuate path by a head drive motor. The card reader/writer device includes a unique card locking mechanism which allows insertion of the card in only one manner and locks the card in place before initiating the reading or writing operation of the device. The interface circuit controls the forward and reverse motion of the head drive motor, converts magnetic data previously recorded on the card into digital information and records digital information onto the magnetic stripe card in the form of magnetic data.

11 Claims, 14 Drawing Figures

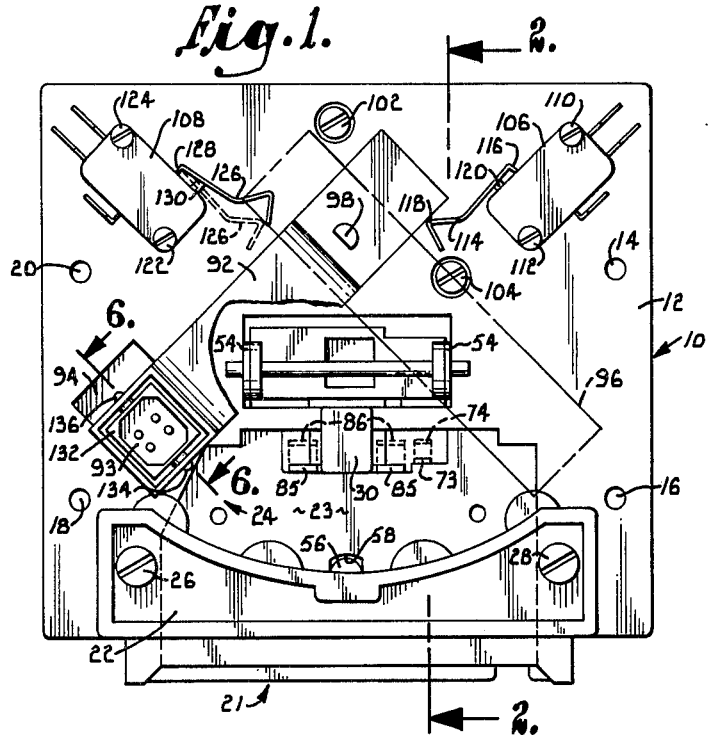

APPARATUS FOR READING AND WRITING DATA ONTO A MAGNETIC STRIPE AND IN AN ARCUATE PATH

BACKGROUND AND BRIEF DESCRIPTION OF THE INVENTION

This invention relates in general to a magnetic stripe card reader/writer apparatus comprising a card reader/writer device and an associated interface circuit that can be easily modified for use in a number of different operating environments. In particular, the card reader/writer apparatus of the present invention is capable of recording magnetic data onto a magnetic stripe card and in an arcuate path and of converting magnetic data previously recorded on the magnetic stripe card into digital information that can be operated upon by external circuitry to control the operation of various types of information.

The use of card reader devices as the input medium for various types of computer based systems, such as point-of-sales input terminals and cash dispenser terminals, is well known in the prior art. These prior art card reader devices are designed to encode data onto a magnetic card in straight line data paths using the edge of the card as a guide so that the data paths are parallel to one edge of the card. Card reader devices are usually designed to be used in one of two operating environments. The first operating environment consists of systems in which the user operates the card reader/writer device directly and has a strong incentive to tamper with the card or card reader/writer device during the reading or writing operation because of a personal benefit to be derived from doing so. The second operating environment includes systems where an attendant operates the card reader/writer device and systems where the user has nothing to personally gain by manipulating the card or card reading device during the reading or writing operation.

In systems where it is advantageous for the user to manipulate the reading or writing operation of the device, the card reader device typically takes the card away from the user and performs the encoding and/or decoding operation out of the user's reach. These card reader devices use friction type, motor driven rollers to drive the card into and out of the card intake enclosure and include card edge guides to maintain the proper orientation of the card within the device. The reading and writing operation is performed in these devices by driving the card along a stationary magnetic head or by driving the head over the card by means of a screw shaft once the card is properly inserted within the enclosure.

In systems where an attendant operates the card reader/writer device or where the user has no personal incentive to manipulate the data on the card, the card reader/writer device normally consists of a card intake slot into which the card is inserted against a stop and a screw shaft for moving the magnetic head over the card or a stationary head over which the card is manually moved.

These prior art systems can not be employed in a number of potential applications because they are either too costly to use or do not include adequate safeguards to prevent fraudulent manipulation of the data. Furthermore, it is relatively inexpensive to make a card reader device for fraudulently copying data from a valid card onto another card. This procedure is relatively easy to accomplish because the magnetic data tracks are generally parallel to and a standard distance away from the edge of the card.

The card reader/writer apparatus of the present invention overcomes the above-mentioned problems by moving the magnetic head of the device over the magnet stripe card in a unique manner. The recording head is mounted on one end of a sensor arm which is attached at the other end to the drive shaft of the head drive motor. The drive shaft of the head drive motor provides a pivot point about which the sensor arm can rotate thereby moving the recording head over the magnetic stripe in an arcuate path having a fixed radius.

The card reader/writer device of the present invention also provides a unique locking scheme to assure that the magnetic card is properly inserted and locked into place before the reading and/or writing operation is initiated. In order to assure that the magnetic stripe is properly aligned with the recording head, the card intake slot is designed to accept the card only if it is properly inserted into the device. The card intake slot also includes a locking mechanism that securely locks the card in the intake slot once it is properly inserted. This locking mechanism inhibits external movement of the card during the reading and writing cycles. In this way, the magnetic stripe card must be properly oriented and locked in the card reader/writer device before the reading or writing operation of the present invention will be initiated.

The present invention also includes an interface circuit that is operable to control the forward and reverse motion of the head drive motor, to convert magnetic data previously stored on the magnetic stripe card into digital information, and to record digital information onto the magnetic stripe card in the form of magnetic data. While the interface circuit disclosed herein is a basic circuit, it can easily be modified for use in a number of different operating environments.

The low cost and simplicity of design of the card reader/writer apparatus of the present invention makes it well suited for use as the point-of-sales input medium in vending machines, other time or service controlling apparatus, and other applications where prior art card reader devices would be economically or functionally impractical. This card reader/writer apparatus can be used in conjunction with the external vending machine control circuit discussed herein to form a integrated system that is operable to control the overall operation of a vending machine. In particular, this system is capable of recording a declining balance on the magnetic stripe card each time an item is purchased or after each cycle of multiple, consecutive purchases is completed. In this application, a prospective customer initially purchases a magnetic strip card with a specific dollar amount already programmed onto the card. Thereafter, each time he purchases an item or items from a vending machine, the previously stored balance is decreased by an amount equal to the price of the commodity purchased. Each time an item is selected, the price of the item is compared with the balance on the card and the purchase is not allowed if the balance stored on the card is less than the cost of the item selected.

The vending machine control circuit processes the data stored on the magnetic stripe card to control the vending operation and to perform the above mentioned declining balance function. In particular, the vending machine control circuit initially checks the security code stored on the magnetic stripe card to make sure that the customer is using an appropriate card for that machine. The control circuit then compares the purchase price of the selected item with the balance from the card and dispenses the item if the purchase price is less than or equal to the balance stored on the card. Once the purchase is made, the control circuit subtracts, the cost of the item from the dollar amount previously read into the machine and stores the resultant balance on the card. The card is then returned to the customer with the new balance stored thereon for use at a later time.

The card reader/writer apparatus of the present invention can also be used in conjunction with additional control circuitry to provide a security apparatus that is capable of limiting access to a restricted area. In this application, the magnetic stripe card has a specific security code stored on the card prior to distribution of the card to people with the requisite security clearance. In order to gain access to the restricted area, the holder of the card inserts the card into the card reader device thereby initiating the reading operation performed by the card reader/writer device of the present invention. External control circuitry then compares the security code recorded on the card with a master code stored in the security apparatus. If the two codes coincide, access to the restricted area is then provided to the holder of the card.

The declining balance concept discussed above can also be applied in the security context. For example, access to a particular area, such as a tennis court or other athletic facility, could be made contingent upon payment of a usage fee paid each time the facility was used. Participants would initially be issued by a security card with a predetermined dollar amount preprogrammed onto the card. Thereafter, the balance on the card would be reduced by a set amount each time the facility was used.

It is therefore, an object of the present invention to provide an inexpensive magnetic stripe card reader/writer apparatus that is simple in design and operation.

A further object of the present invention is to provide an inexpensive magnetic stripe card reader/writer apparatus that is operable to record magnetic data onto a magnetic stripe card in an arcuate path having a fixed radius.

An additional object of the present invention is to provide an inexpensive magnetic stripe card reader/writer apparatus that is capable of securely locking the magnetic stripe card into position prior to reading or writing data onto the card thereby assuring that the magnetic stripe on the card is properly aligned with the recording head despite attempts at physical manipulation by the card user.

A further object of the present invention is to provide an inexpensive magnetic stripe card reader/writer device that is capable of reading and writing magnetic data onto a magnetic stripe card in an arcuate path thereby making it more difficult to fraudulently retract data from the card and to reprogram the card by writing spurious data onto it.

An additional object of the present invention is to provide a vending machine control apparatus that is operable to be used as the point-of-sale input medium for a vending machine or other apparatus that dispenses services such as coin operated car washes, washing machines, games, tennis court lighting systems, etc.

An additional object of the present invention is to provide a vending machine control apparatus that is capable of recording a declining balance onto a magnetic stripe card.

It is an additional object of the present invention to provide a vending machine control apparatus that is operable to compare the balance stored on the card with the price of the item to be purchased and to dispense the selected item only if the price of the item is less than the balance stored on the card.

Another object of the present invention is to provide a vending machine control apparatus that is operable to erase the balance stored on the card prior to dispensing the selected item.

Another object of the present invention is to provide a vending machine control apparatus that is operable to subtract the balance and to record the resultant balance on the card.

Another object of the present invention is to provide an inexpensive magnetic stripe card reader/writer device that can be used in conjunction with external control circuitry to serve as the input terminal in a security system.

Further objects of this invention will be made clear or become apparent from the following description and claims when read in light of the accompanying drawings.

DETAILED DESCRIPTION OF THE INVENTION

In the accompanying drawings which form a part of the specifications and are to be read in conjunction therewith and in which like reference numerals are employed to indicate like parts in the various views:

FIG. 1 is a top plan view of the magnetic stripe card reader/writer device of the present invention;

FIG. 2 is a cross-sectional view of a card reader/writer device in a power-on condition without a magnetic card inserted into the device taken along line 2—2 of FIG. 1;

FIG. 3 is a cross-sectional view taken along line 3—3 of FIG. 2;

FIG. 4 is a fragmentary side elevational view looking in the direction of line 4—4 of FIG. 3 wherein portions are broken away for purposes of illustration;

FIG. 5 is a cross-sectional view taken along line 5—5 of FIG. 3 showing the position of the locking arm when the card reader/writer device of the present invention is in a power-on condition with a magnetic card properly inserted;

FIG. 6 is a cross-sectional view taken along line 6—6 of FIG. 1;

FIGS. 10A, 10B, 10C, 10D are to be arranged to provide a detailed schematic diagram of the vending machine control circuitry needed to process the magnetic data stored on the card and to generate the declining balance in a vending machine application.

Figure 7:
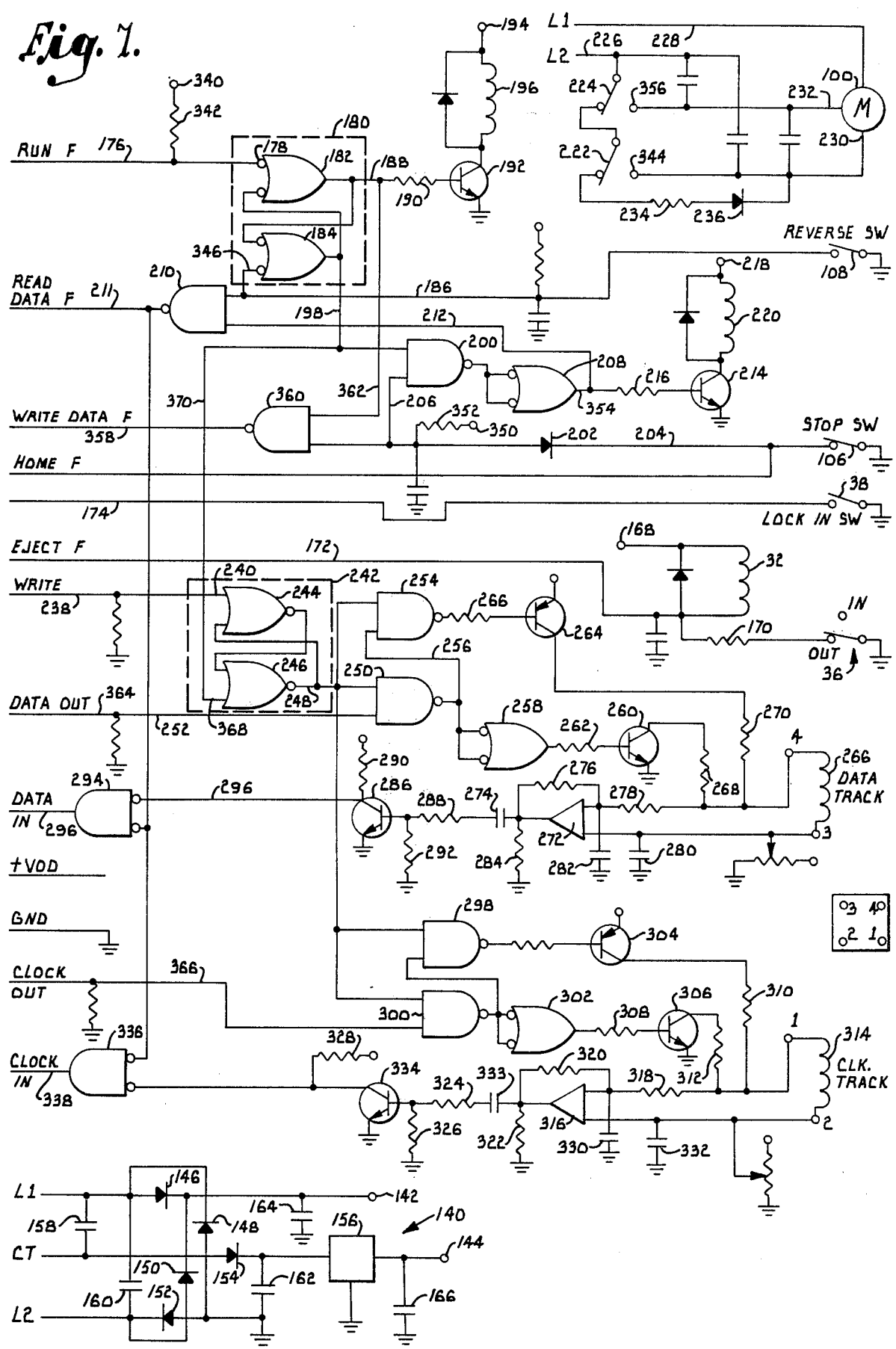
FIG. 7 is a schematic diagram of the card reader/writer interface circuit.

Referring initially to FIG. 1, the card reader/writer device of the present invention is designated generally by the numeral 10. A flat base plate 12 is provided to serve as the base upon which the operable components of the devices are to be mounted. The base plate is constructed of rigid plastic or any other suitable non-conducting material. The base plate is provided with four holes 14, 16 18 and 20 which provide a means for securing mounting brackets to the base plate by means of mounting screws inserted through these holes.

Card intake slot 21 is provided to receive the magnetic stripe card. This slot is formed by card retainer bar 22 which is positioned over a recessed area 23 of the base plate 12. The recessed area is designed to conform to the external dimensions of the magnetic stripe card so that the card intake slot will only accept cards of the proper size and configuration. As viewed in FIG. 1, the upper left hand corner of the card intake slot (generally indicated by the numeral 24) is cut at an angle to provide a key feature to the card intake slot. The magnetic stripe card is similarly shaped with one of the corners cut at a corresponding angle.

Card retainer bar 22 in conjunction with the above mentioned recess 23 and the base plate 12 forms a slot into which the magnetic stripe card can be inserted. Card retainer bar 22 is secured to the base plate by means of mounting screws 26 and 28. The depth of the recessed area is of particular importance because it is essential to the proper operation of the card reader/writer device that the card remain flat during the reading and writing operation. Therefore, the card intake slot formed by recess 23 and card retainer bar 22 must be only slightly greater than the thickness of the magnetic stripe card. By making the slot slightly greater than the thickness of the card, a warped card inserted into the reader/writer device will be forced to lie flat thereby providing a level surface over which the magnetic head can be moved. Card hold down tab 30 is provided to keep the magnetic stripe card flat during the reading and/or writing operation of the present invention.

Referring now to FIGS. 2, 3, and 4, the unique locking mechanism of the present invention is shown in detail in these figures. The locking mechanism is basically comprised of latch solenoid 32, latch arm 34, card in switch 36, and lock-in switch 38. These components of the locking mechanism are mounted on a U-shaped support bracket 40 which is secured to the underside of base plate 12 by means of mounting screws 42 and 44. Latch solenoid 32 is secured to the U-shaped mounting bracket 40 by means of two mounting screws which pass through holes in the mounting bracket and contact threaded holes 46 and 48 on the solenoid. The plunger assembly 50 of the latch solenoid is secured to the latch arm 34 by means of cotter pin 52.

Latch arm 34 is constructed of sturdy plastic and is hingedly connected to base plate 12 at 54 (a top view of the hinge connection is shown in FIG. 1). The latch arm is capable of pivoting about this point in response to movement of plunger assembly 50. The card latch is provided with a locking pin 56 which is positioned to pass through a hole 58 in the base plate 12. The magnetic stripe card is also provided with a corresponding hole through which the locking pin can pass when the card is properly inserted. An expansion spring 60 provides a constant rotational force to card latch 34 tending to drive the locking pin 56 up through hole 58 in base plate 12. One end of expansion spring 60 is physically connected to the card latch at 62 while the other end of the spring is wrapped around cotter pin 64 which is rigidly connected to mounting bracket 64.

Card in switch 36 is secured to support bracket 40 by means of nut and bolt assemblies 66 and 68. This switch includes a contact arm 70 which is hingedly connected to the switch at 72. The contact arm extends over switch button 76 so that movement of the arm about its hinge point will cause the card in switch 36 to be opened and closed. The other end of contact arm 70 protrudes through a hole in the base plate as shown in FIG. 1. This end of the arm extends above the recessed area of the base plate so that a properly inserted card will contact this arm and move it from its normal position 73 to the card in position 74. Movement of the contact arm in this manner causes the contact arm to pivot about hinge point 72 thereby closing switch button 76.

Referring briefly to FIGS. 3 and 4, the lock in switch is secured to mounting bracket 40 by means of nut and bolt assemblies 78 and 80. Lock in switch 38 includes switch button 82 which is covered by the protruding arm 81 of the card latch 34. Pivotal movement of the card latch about its hinge point 54 causes the protruding arm of the card latch to contact switch button 82, thereby opening and closing the lock in switch in response to the pivotal movement of the card latch 34.

Referring now to FIGS. 1, 2 and 3, a card return arm 84 is provided to force the magnetic stripe card out of the card intake slot upon termination of the reading and/or writing operation. One end of the card return arm is hingedly connected to cotter pin 64, while the other end of the arm protrudes through a hole in the base plate. The card return arm extends above the recessed area of the base plate and is capable of contacting the magnetic stripe card when it is properly inserted. A properly inserted card causes the card return arm to move from its normal arm position 85 as shown in FIG. 1 to its card in position shown in FIG. 1 by broken lines at 86. An extension spring 88 is provided to impart a constant outward force to the card return arm which tends to keep the arm in its normal position 85. The connection of the extension spring is shown in greater detail in FIG. 4. As shown in FIG. 4, one end of the extension spring is hooked around a notch 90 on the U-shaped mounting bracket 40. The other end of the spring is hooked through a hole in the return arm at 91.

Sensor arm 92 is provided to move the magnetic head over the magnetic stripe card in an arcuate path. The magnetic head 93 is mounted on one end of the sensor arm while the other end of the arm is mounted to the drive shaft 98 of the head drive motor 100. The head arm is constructed of an acetal plastic or any other suitable material which exhibits a prescribed amount of downward force to maintain intimacy between the magnetic head 93 and the magnetic stripe card. As viewed in FIG. 1, the head arm is shown in solid lines in a standby condition and in its return position in broken lines at 96. When the head arm is in the standby position, the magnetic head mounted on the arm rests in a recessed area 94 of base plate 12. The recessed area is provided to relieve the stress on the arm which may cause it to "creep" thereby losing a degree of its downward spring force.

The head drive motor 100 is mounted to the underside of base plate 12 by means of mounting screws 102 and 104. As viewed in FIG. 1, the head drive motor is operable to rotate its output shaft 98 in either a counter-clockwise (forward) or clockwise (reverse) direction. The extent of this rotational movement is controlled by means of motor stop switch 106 and motor reverse switch 108.

Motor stop switch 106 is mounted to the base plate 12 by means of mounting screws 110 and 112. This switch is equipped with a contact arm 114 which is hingedly secured to the switch at 116 and extends over switch button 120. The other end 118 of contact arm 114 is arranged to contact sensor arm 92 so that motor stop switch 106 will be opened and closed in response to the rotational movement of the sensor arm.

The motor reverse switch, on the other hand, is mounted to the base plate by means of mounting screws 122 and 124 and also includes a contact arm 126 which is hingedly secured to the switch at 128. Contact arm 126 covers switch button 130 and thereby controls the switch state of the motor reverse switch. Switch contact 126 is shown in its open position in solid lines and in its reverse position in broken lines.

Referring briefly to FIGS. 1 and 6, the magnetic head 93 is fitted with a mounting collar 132 which fits securely around the mounting head. The mounting collar includes two prongs 134 and 136 that fit into corresponding holes 135 and 137 in the sensor arm. This mounting arrangement allows the head surface to articulate and ride along uneven portions of the magnetic stripe while still maintaining intimate contact with the stripe.

Referring now to FIG. 7, the basic interface circuit is schematically illustrated in this figure. The interface circuit is basically comprised of two operating sections. The first operating section is the motor control section which is operable to control the forward and reverse motion of the head drive motor while the second operating section is the transducer section which is operable to record data onto the magnetic stripe card and to reproduce previously recorded data. The basic interface circuit shown in FIG. 7 is interconnected with external control circuitry that processes the digital data provided to it by the interface circuit of the present invention. This interface circuit is a basic circuit that can be easily modified to accomodate a number of different operating environments.

The power supply for the interface circuit is generally indicated by the number 140. The power supply is capable of providing a 24 volt unfiltered power signal at output terminal 142 for use on the power devices such as relays and solenoids and a 12 volt filtered output signal at output terminal 144 for use by the analog and logic circuits. The power supply includes a full wave rectifier made up of diodes 146, 148, 150 and 152, voltage regulator 156, diode 154 and capacitors 158, 160, 162, 164 and 166. Both of the power signals produced by the power supply 140 are referenced to system ground.

The above mentioned card in switch 36 is connected in series with power input 168, latch solenoid 32, resistor 170, and system ground. An eject false line 172 electrically couples the latch solenoid with the external control circuitry. Lock in switch 38 is also operably connected to the external control circuitry by means of conductor line 174.

A forward or counter-clockwise run of the head drive motor 100 is initiated by the external control circuitry via run false input line 176. This line is connected to the set input 178 of flip-flop 180 which is comprised of logic gates 182 and 184. The reset input of this flip-flop, on the other hand, is electrically connected to reverse switch 108 by means of conductor line 186. The set output 188 of this flip-flop is coupled through resistor 190 to the base of switching transistor 192. Switching transistor 192 is arranged in series with power input 194, relay solenoids 196 and system ground. The flip-flop reset output 198 serves as one of the inputs to logic gate 200. The other input to this logic gate is operably connected through diode 202 to stop switch 106 via conductor lines 204 and 206. The output of logic gate 200 is provided to inverter 208. Inverter 208 is electrically connected to logic gate 210 by means of conductor line 212 and to the base of switching transistor 214 by means of resistor 216. Switching transistor 214 is arranged in series with power input 218, relay solenoid 220 and system ground.

Relay solenoids 196 and 220 control the switch state of relay contacts 222 and 224 respectively. These contacts effectively control the head drive motor 100 by providing power from input lines 226 and 228 to the forward 230 and reverse 232 inputs of the motor depending upon the switch state of these relays. Resistor 234 and diode 236 are arranged to provide an electronic braking action to the head drive motor 100.

The recording operation is initiated by the external control circuitry via write line 238. This line is connected to the set input 240 of flip-flop 242 which is comprised of logic gates 244 and 246. The reset output 248 of this flip-flop serves as one of the inputs to logic gate 250. The other input of this logic gate is data out line 252 which inputs electronic data from the external control circuitry. The reset output of flip-flop 242 also acts as an input to logic gate 254. The other input to this logic gate is electrically coupled via conductor line 256 to the output of logic gate 250. Logic gate 250 is also connected to logic gate 258 which is electrically coupled to the base of switching transistor 260 through resistor 262. The output of logic gate 254 is connected to the base of switching transistor 264 via resistor 266. Switching transistors 260 and 264 are electrically connected to head coil 266 by means of resistors 268 and 270. These switching transistors generate the current reversals necessary to record magnetic data onto the magnetic stripe card by means of head coil 266.

Head coil 277 is also operable to sense and reproduce data previously recorded on the card. The voltage pulses produced by head coil 266 in response to the presence of magnetic data on the card are initially amplified in operational amplifier 272. This amplifier includes associated components 274, 276, 278, 280, 282 and 284 to assist in the removal of noise and other extraneous information. The amplified voltage pulse is then provided to the base of switching transistor 286 by means of resistor 288. Resistors 290 and 292 are provided to properly bias switching transistor 286. Switching transistor 286 is electrically connected to one input of logic gate 294 via conductor line 296. The other input of this logic gate is provided by logic gate 210. The output of logic gate 294 is designated on this figure as the data in line 296 and serves to provide the reproduced electronic data to the external control circuitry. This logic gate inhibits transmission of data to the external control circuitry when the head drive motor is not moving in a forward direction.

The writing of clock data onto the magnetic stripe card is accomplished by logic gates 298, 300 and 302, switching transistors 304 and 306, resistors 308, 310 and 312 and magnetic head coil 314. The reading of clock data by head coil 314 is performed by this element in combination with operational amplifier 316, resistors 318, 320, 322, 324, 326 and 328, capacitors 330 and 332 and switching transistor 334. Logic gate 336 is provided to inhibit transmission of the clock data to the external control circuitry when the head drive motor is not moving in a forward direction. Clock data is provided to the external control circuitry by means of clock in line 338.

In operation, the card reader/writer device of the present invention will not accept a magnetic stripe card when electrical power is not being supplied to the device. In a power-off condition, latch solenoid 32 is de-energized allowing extension spring 60 to pull the card latch arm 34 upward so that locking pin 56 will protrude through the hole 58 in the base plate blocking entry of a card. However, application of electrical power to the card reader/writer device activates latch solenoid 32 thereby forcing the plunger assembly downward (as viewed in FIG. 2). As viewed in FIG. 2, this downward force imparts a counter clockwise rotational force to latch arm 34 about its hingepoint 54. Since the counter clockwise rotational force imparted to the latch arm 34 by latch solenoid 32 is greater than the clockwise rotational force imparted to the latch arm by extension spring 60, latch arm 34 is pulled downward by the latch solenoid upon application of power to the device. This downward action moves locking pin 56 out of position in the card intake slot thereby providing a clear channel into which card can be inserted.

It should be pointed out at this time that the card intake slot includes a key feature which allows for full insertion of the magnetic stripe card in only one manner. As viewed in FIG. 1, the upper left hand corner of the card intake slot (generally indicated by the numeral 24) is cut at an angle to provide the above mentioned key feature. The magnetic stripe card is similarly shaped with one of its corners cut at a corresponding angle. In order to fully insert the card into the card intake slot, the keyed corner of the card must be aligned with the keyed corner of the intake slot. If the card is properly inserted, the keyed corner of the card matches the keyed corner of the card intake slot allowing the card to be fully inserted into the card reader/writer device. Improper insertion of the magnetic stripe card, on the other hand, causes a square corner of the card to come in contact with the keyed corner of the slot prior to full insertion of the card. In this way, the magnetic stripe card can only be inserted in one manner thereby insuring the proper orientation of the magnetic stripe on the card with respect to the magnetic head of the card reader/writer device.

Referring now to FIGS. 1 and 2, proper insertion of the magnetic stripe card drives the card return arm 84 back from its normal position 85 to the card in position 86. Movement of the card return arm in this manner causes the extension spring 88 (as shown in FIG. 4) to expand. Expansion of extension spring 88 imparts a resultant force to the card return arm which tends to return this arm to its normal position 85. A properly inserted magnetic stripe card also acts on contact arm 70 to change the switch state of card in switch 36.

As viewed in FIG. 7, card in switch 36 is connected in series with power input 168, latch solenoid 32, resistor 170, and system ground. When the card in switch 36 is in the card out position shown in FIG. 7, the latch solenoid is activated. Insertion of a magnetic stripe card changes the switch state of card in switch 36 thereby opening the latch solenoid activation circuit. Opening this circuit in turn de-energizes the latch solenoid 32.

Referring now primarily to FIGS. 1 and 2, deactivation of latch solenoid 32 removes the downward force applied to card latch 34 by the solenoid plunger assembly 50. Upon removal of this force, extension spring 60 drives the card latch 34 upward causing the locking pin 56 to pass through the hole 58 in the base plate 12. The locking pin 56 also passes through a corresponding hole in the magnetic stripe card to securely lock the card in place within the card reader/writer device. Upward movement of the card latch 34 in response to de-energization of latch solenoid 32 causes arm 81 (as shown in FIG. 3) to act on switch button 82 of lock in switch 38.

FIG. 5 shows the position of latch arm 34 when a magnetic stripe card 57 is properly inserted. As shown in this figure, locking pin 56 is protruding through the hole in the base plate and the hole in the inserted card securely locking the card in place.

Referring now to FIG. 7, closure of the lock in switch 38 generates an activation signal which is provided to the external control circuitry by means of conductor line 174. This activation signal indicates that the magnetic stripe card is properly locked in place and that the reading or writing operation can be initiated.

The reading and/or writing operation of the present invention is initiated by the external control circuitry by grounding the run false input line 176. Grounding this line sets flip-flop 180 by removing the positive logic signal normally provided to the inverted set input 178 by means of power input 340 and resistor 342. Setting flip-flop 180 provides a positive voltage signal at output 188 which changes the switching state of switching transistor 192. Switching transistor 192 is an on and off type saturation transistor which allows current to flow from collector to emitter in response to a positive base voltage. Saturation of this transistor causes current to flow from power input 194 through relay solenoid 196 and switching transistor 192 to system ground causing relay solenoid 196 to be energized. Energization of relay solenoid 196 causes relay contact 222 to switch from the standby position shown in FIG. 7 to the forward run position wherein the moveable contact is connected to stationary terminal 344. In this state, power is provided to the forward input 230 of the head drive motor thereby causing the motor to run in a forward direction. Flip-flop 180 remains in a set condition until a reset signal is applied to flip-flop input 346 upon closure of reverse switch 108. While this flip-flop is in a set condition, a positive voltage signal will be continuously provided to the base of switching transistor 192 so that the head drive motor will remain in a forward running condition until the flip-flop is reset. Upon closure of reverse switch 108, flip-flop 180 is reset causing the relay solenoid 196 to be de-energized. De-energization of this solenoid returns relay contact 222 to the standby position shown in FIG. 7 thereby imparting an electronic braking action to the head drive motor through resistor 234 and diode 236.

As viewed in FIG. 1, while the head drive motor is in a forward run condition, sensor arm 92 is being driven in a counter-clockwise direction from the standby position shown in solid lines at 92 to the return position shown in broken lines at 96. Movement of the sensor arm in a forward direction causes the back part of the sensor arm to lose contact with arm 114 thereby opening stop switch 106. The head drive motor continues in a forward run condition until the sensor arm closes the return card switch by acting on contact arm 126 as shown in broken lines.

Returning now to FIG. 7, opening stop switch 106 in response to forward movement of the sensor arm causes a positive logic signal inputted at power terminal 350 to be provided to logic gate 200 via resistor 352 and conductor line 206. The other input to this logic gate is formed by the reset output of flip-flop 180. Once flip-flop 180 is reset in response to closure of reverse switch 108, Nand gate 200 is inhibited which in turn causes inverter 208 to provide a positive voltage at output 354. This positive voltage signal is then provided to the base of switching transistor 214 causing this transistor to be saturated thereby energizing relay coil 220. Energization of this relay coil changes the switch state of relay contact 224 from the standby position shown in FIG. 7 to the reverse position wherein relay contact 224 is in contact with stationary terminal 356. This switch state provides a power signal to the reverse input 232 of the head drive motor 100. Application of power to the reverse input of the head drive motor causes the motor to run in a reverse direction thereby moving the sensor arm 92 in a clockwise direction as viewed in FIG. 1.

The head drive motor continues to run in a reverse direction until the sensor arm 92 returns to its home position causing stop switch 106 to be closed. Closure of stop switch 106 causes logic gates 200 and 208 to remove the position voltage signal being provided to the base of switching transistor 214. Removal of this signal de-energizes relay solenoid 220 forcing relay contact 224 to return to the standby position shown in FIG. 7.

The positive voltage signal from inverter 208 is also provided to logic gate 210 which provides operating information to the external control circuitry via the read data false line 211. Operating information is also provided to the external control circuitry by means of the write false data line 358 from logic gate 360. One of the inputs to this logic gate is connected to the set output 188 of flip-flop 180 by means of conductor line 362 while the other input to this logic gate is connected to the stop switch 106 by means of conductor line 204.

The external control circuitry initiates the writing operation by providing a write signal to the set input 240 of write flip-flop 244 by means of the write input line 238. Setting this flip-flop causes the reset output 248 to go low thereby providing a logic level signal of the appropriate value to logic gates 250, 254, 298 and 300. Thereafter, the presence of a data pulse on data outline 364 causes switching transistors 260 and 264 to be alternately activated to produce a current reversal in magnetic head 266. This current reversal causes the magnetic head 266 to record information onto the magnetic strip card in the form of magnetic data. Likewise, the presence of a clock pulse on clock line 366 causes switching transistors 304 and 306 to send a current reversal in magnetic head 314. The presence of a current reversal in magnetic head 314 records clock information onto the magnetic stripe card in the form of magnetic data. In this embodiment of the magnetic stripe card reader/writer device, both data and clock information is recorded onto the magnetic card by the device.

Once the write flip-flop 244 is set, the external control circuitry activates the head drive motor in a forward direction by providing a run signal to the run false input line 176. Thereafter, each data and clock pulse provided to the interface circuit via data out line 364 and clock out line 366 records data and clock information onto the card by causing a current reversal in the appropriate magnetic head coil. The sensor arm continues to move in a forward direction until it reaches the return position. Upon reaching the return position, reverse switch 108 resets flip-flop 180 thereby providing a positive logic signal on reset output line 198. This logic signal is provided to the reset input of write flip-flop 242 by means of conductor line 37 and resets this flip-flop terminating the write mode of operation.

The read mode of operation is initiated by moving the head drive motor 100 in a forward direction without setting write flip-flop 244. Thereafter, each time the magnetic head comes across a stored magnetic pulse a voltage pulse will be generated within the head. Unlike the write mode of operation, the card reader/writer device need not be specially set in the read mode since the card reader/writer device is naturally in this mode unless write flip-flop 242 is set. The reproduced data pulses are first amplified in operational amplifier 272 which in conjunction with resistors 276, 278, 284, 288 and 292 and capacitors 274, 280 and 282 cleans up the noise present in the incoming signal. The generated voltage pulses are then provided to switching transistor 286, which only allows passage of positive data pulses. In this way, the card reader/writer device of the present invention only detects data pulses that are of a predetermined direction. The filtered data pulses are then provided to one input of logic gate 294 by means of conductor line 296. Logic gate 294 inhibits transmission of data pulses to the external control circuitry by means of data in line 296 unless the output of logic gate 210 indicates that the sensor arm is moving in a forward direction. The reproduction of clock information is performed in basically the same manner. Magnetic head 314 detects the clock pulses previously stored on the magnetic stripe card. These pulses are then amplified in operational amplifier 316 which operates in conjunction with resistors 318, 320, 322, 324 and 326 and capacitors 330, 332, and 333 to clean up the reproduced clock signal. Switching transistors 334 filters out clock pulses that are not of the appropriate direction and logic gate 336 inhibits transmission of clock information to the external control circuitry by means of clock in line 338 if the sensor arm is not moving in a forward direction.

Referring now to FIGS. 10A, 10B, 10C and 10D, a vending machine control circuit for processing the digital data from a magnetic stripe card is schematically illustrated in these figures. This circuit operates in conjunction with the interface circuit of FIG. 8 and the card reader/writer device of FIGS. 1-6 to form an integrated system for controlling the operation of a vending machine.

The recorded data includes security information to insure that an appropriate card is being used and value information representative of the balance recorded on this card. The reproduced data is stored in the vending machine control circuit where the security code contained on the card is checked and validated before the vending operation is initiated. If the security code stored on the magnetic stripe card does not correspond with the code stored in the vending machine, the card is automatically returned to the customer before the vending operation is initiated. A valid security code, on the other hand, initiates the vending operation by erasing the data stored on the card prior to dispensing of the selected item. It should be emphasized that in this application only the data track is erased prior to dispensing of the selected item. The clock track remains unchanged during the entire vending operation and acts as the clocking signal for recording data onto the magnetic stripe card. In this way, the clock track originally programmed onto the magnetic stripe card synchronizes the reading and writing operation of the device.

If the stored balance is greater than or equal to the price of the selected item, the vending machine control circuit causes the associated vending machine to dispense the selected item. Once the item is dispensed, the price of the item is subtracted from the stored balance and the resultant balance is stored in the vending machine control circuit.

When the customer has completed making his purchases, he presses a card return switch indicating to the vending machine control circuit that he is finished. Closure of this switch initiates the cycle for recording the new balance onto the card. The writing operation is accomplished by first activating the head drive motor and then generating data pulses in response to detection of clock pulses recorded on the magnetic stripe card. Data pulses are generated a set period of time after the occurrence of a clock pulse so that data will be recorded onto the magnetic stripe card in the interval between clock pulses. In this embodiment, a logic level zero is recorded onto the card between clock pulses in the form of a blank space wherein no data pulse occurs. A logic level one, on the other hand, is represented by a recorded data pulse occurring between two clock pulses.

Figure 8:
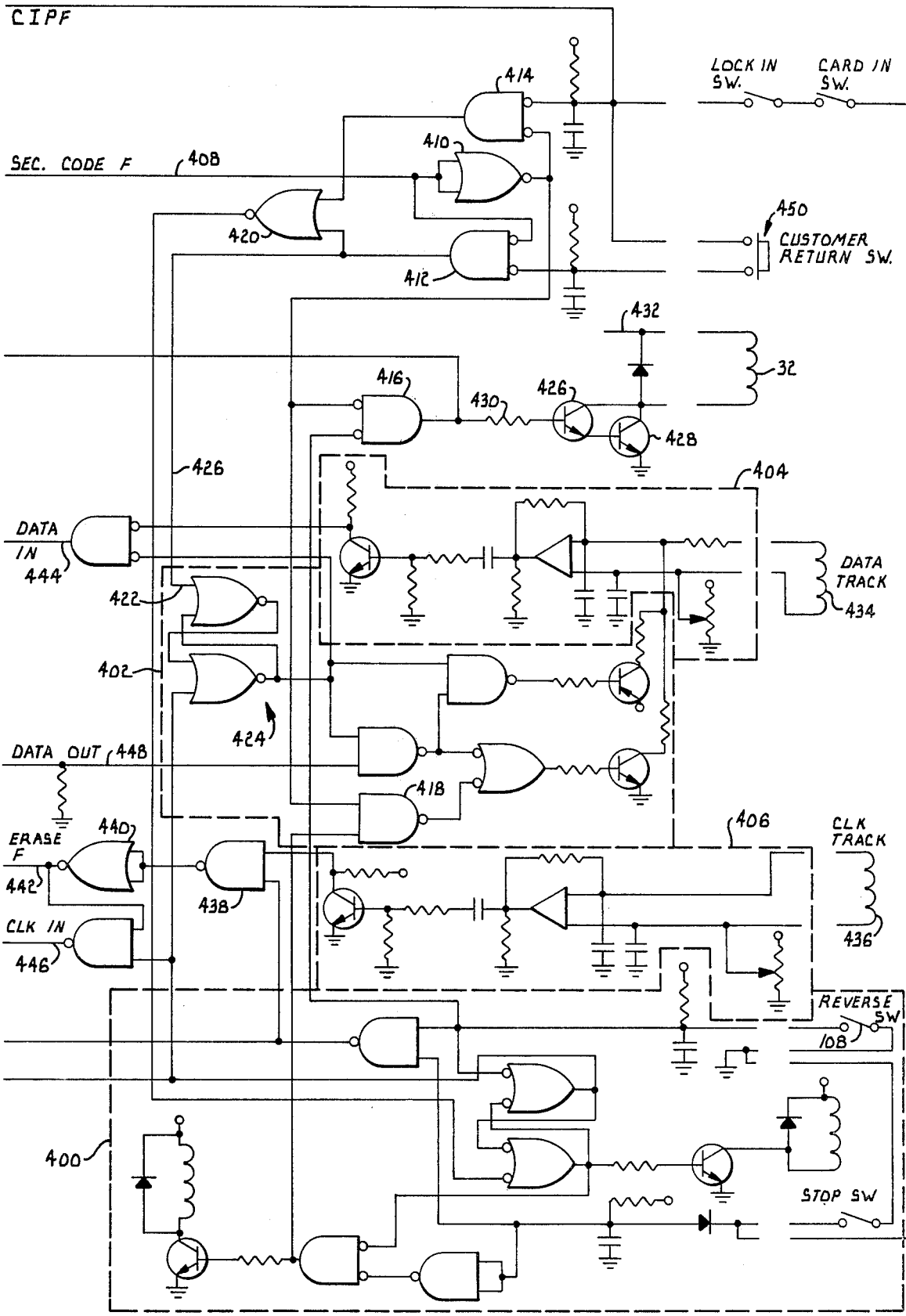
FIG. 8 is a schematic diagram of an interface circuit specifically designed for use in a vending machine application.

Referring now to FIG. 8, the interface circuit to be used in a vending machine application is shown in this figure. While this interface circuit is basically the same as the one shown in FIG. 7, it does contain certain modifications to accomodate the unique operating environment associated with this embodiment of the invention.

The motor control circuitry enclosed within broken lines 400 is the same in design and operation as that described above with respect to FIG. 7. The transducer section, on the other hand, includes the same data write circuitry 402 for recording data onto the magnetic stripe card, data read circuitry 404 for reproducing data previously recorded onto the card and clock read circuitry 406 for reproducing clock information stored on the card but does not include any clock write circuitry since the clock track is never changed in this embodiment.

Upon closure of reverse switch 108, the magnetic stripe card is either returned to the customer or erased depending upon the validity of the recorded security code. The security code is checked in the vending machine control circuit in a manner to be described more fully below. The results of this check are provided to the interface circuit of FIG. 7 via the security code false line 408. This line is electrically connected to inverter 410 and serves as one of the inputs to logic gage 412. Inverter 410 is electrically coupled with logic gates 414, 416 and 418. The output of logic gate 412, on the other hand, serves as one of the inputs to logic gate 420 and is electrically connected to the set input 422 of the write flip-flop 424 by means of conductor line 426.

As invalid security code prompts the vending machine control circuit to provide a positive logic signal to the interface circuit on the security code false line 408. A positive logic signal on the security code false line 408 causes logic gate 416 to be enabled upon closure of reverse switch 108. The high voltage signal thus produced is provided to the base of switch transistors 426 and 428 through resistor 430. These transistors are connected in series with power input 432, latch solenoid 32 and system ground. A positive voltage applied to the base of switching transistor 426 saturates transistors 426 and 428 allowing current to flow from power input 432 to ground through latch solenoid 32 and these transistors. This current flow activates latch solenoid 32 causing the card to be automatically returned to the customer before the vending operation is initiated.

A valid security code, on the other hand, prompts the vending machine control circuit to provide a low level logic signal to the interface circuit by means of the security code false line 408. A low signal on the security code false line causes the data write circuitry 402 to provide a D.C. voltage signal to the data head coil 434 during the reverse run of the head drive motor. This D.C. voltage signal erases the data stored on the card as the sensor arm sweeps back to the standby position. As the data on the card is being erased, the clock head 436 simultaneously reads clock pulses and provides these pulses to the vending machine control circuit by means of logic gates 438 and 440 and the erase false line 442.

The reproduced data and clock pulses are provided to the vending machine control circuitry via the data in line 444 and the clock in line 446 respectively. Data to be recorded onto the magnetic stripe card is provided to the interface circuit via the data out line 448. The customer return switch 450 is provided to terminate the vending operation. Closure of this switch indicates to the vending machine control circuit that the customer has finished making his purchases causing the circuit to record the security code and new balance onto the card.

Referring now to the vending machine control circuitry shown in FIGS. 10A, 10B, 10C and 10D, data and clock information is provided to the circuit from the interface circuit of FIG. 8 via data in line 500 and clock in line 502, respectively. The security code is stored in registers 508, 510, 512 and 514 while value data is stored in registers 504 and 506. Data is read into this circuit using the above described binary parallel mode. In other words, upon receipt of the first clock pulse, the storage registers search for a data bit until receipt of the next clock pulse on clock input line 502. The presence of a data pulse on data input line 500 during this search interval signifies that this bit represents a logic one. However, if no data pulse is received during this search interval, the data bit represented by this interval is stored as a logic level zero.

Figures 9, 10A, 10B, 10C, 10D, 11:
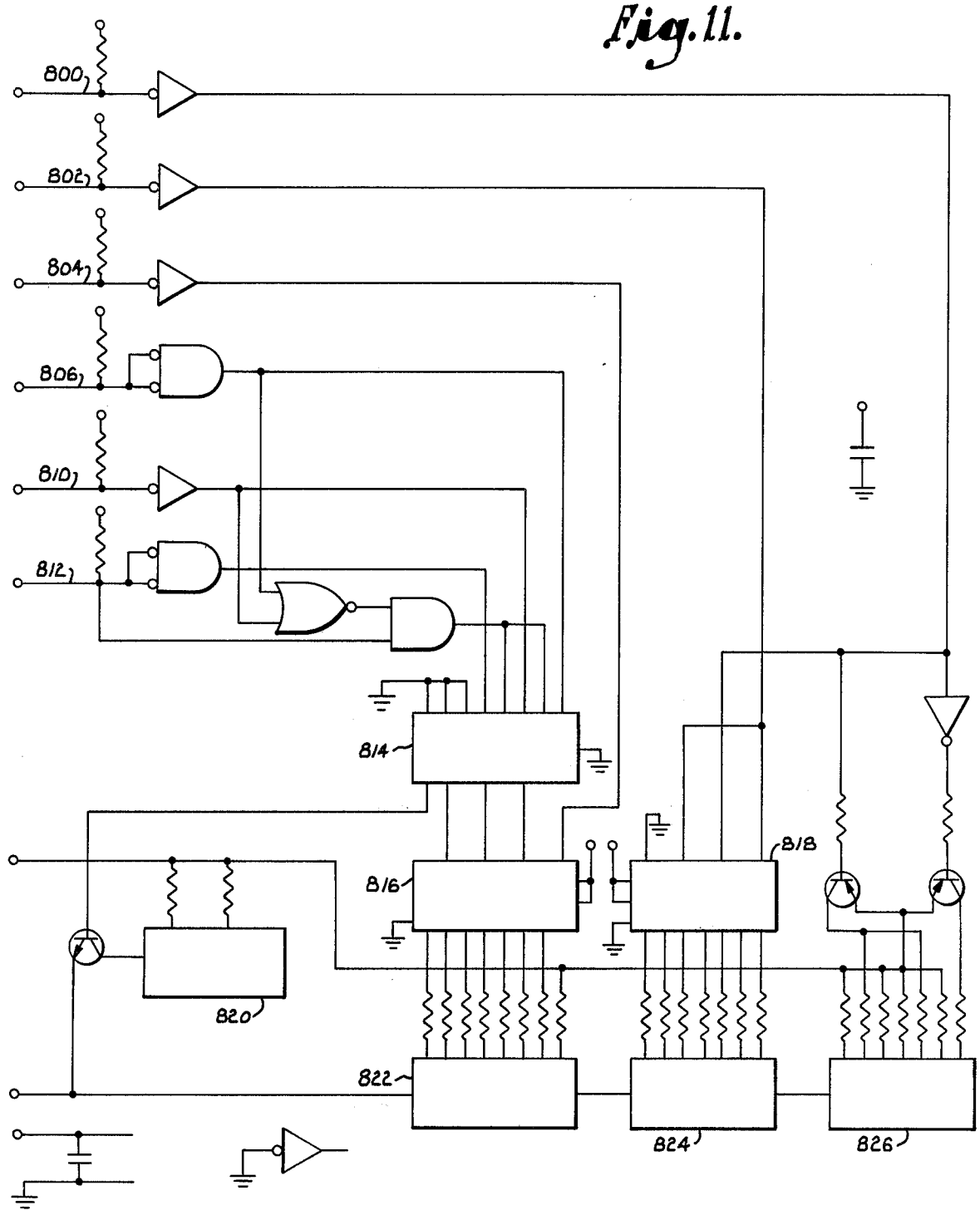
FIG. 9 is a plot showing how
FIGS. 10A, 10B, 10C and 10D are to be arranged for proper viewing.
FIG. 11 is a schematic diagram of the display circuitry used to show the current balance stored on the magnetic card.
Figure 10A:
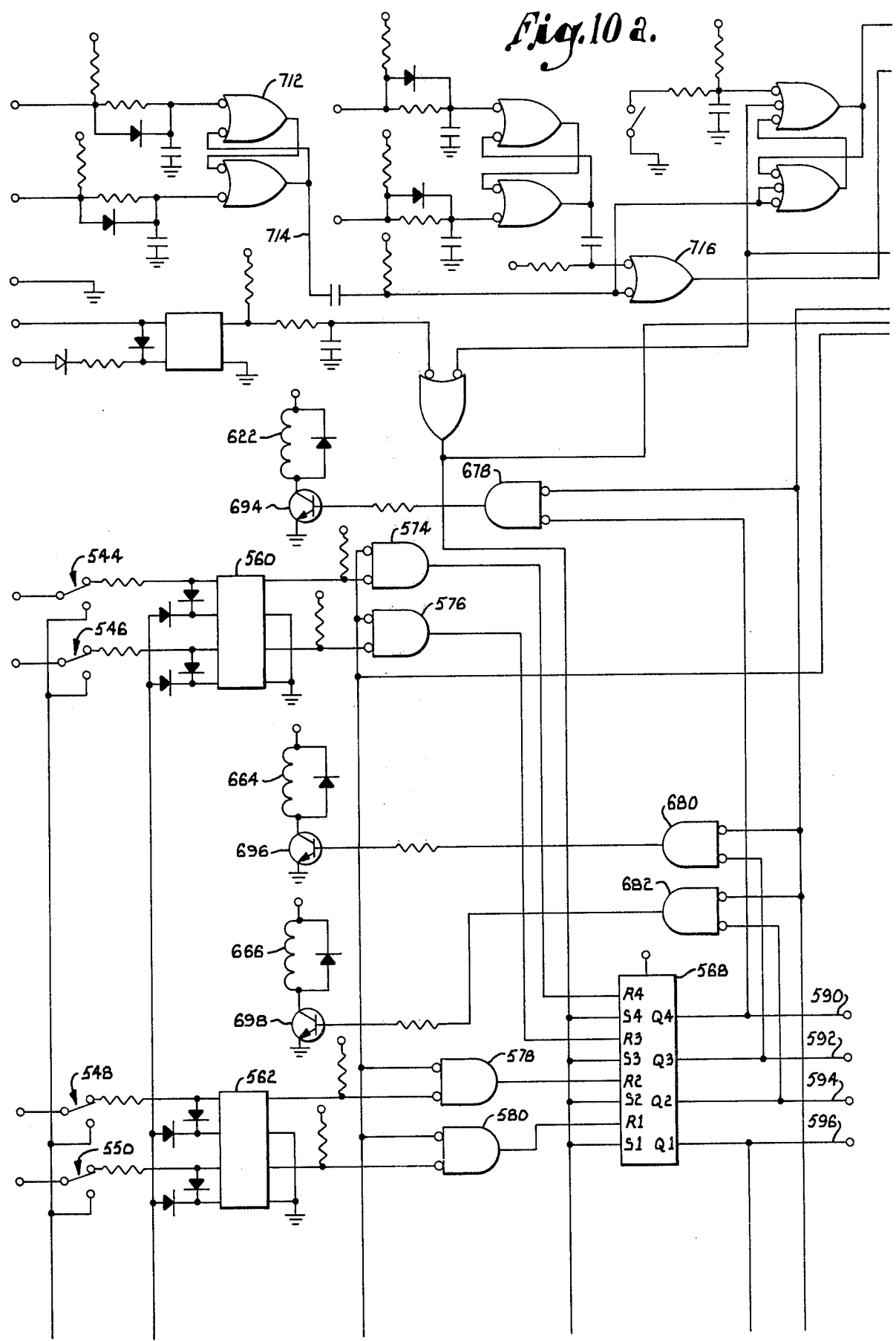
Figure 10B:
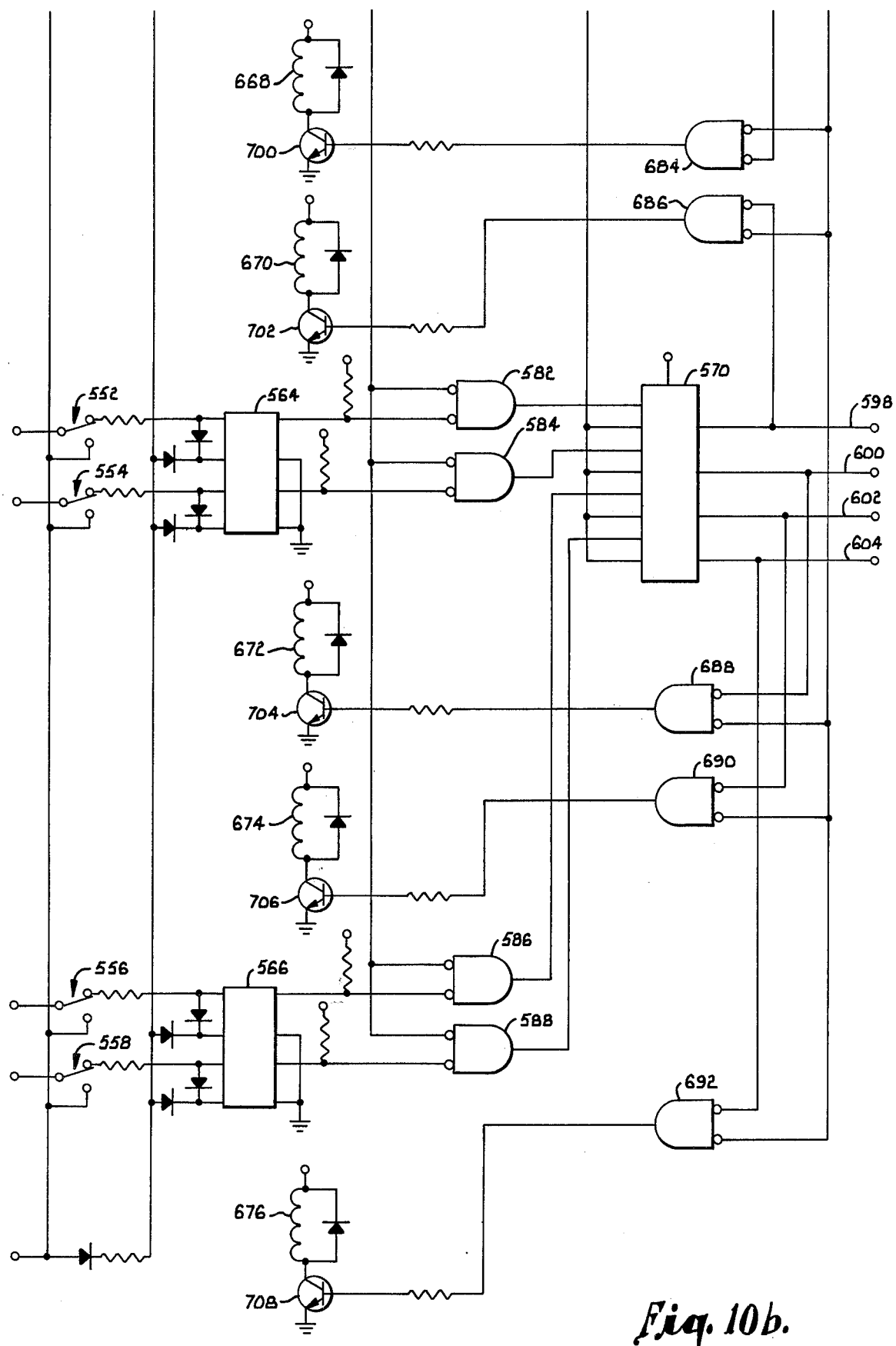
Figure 10C:
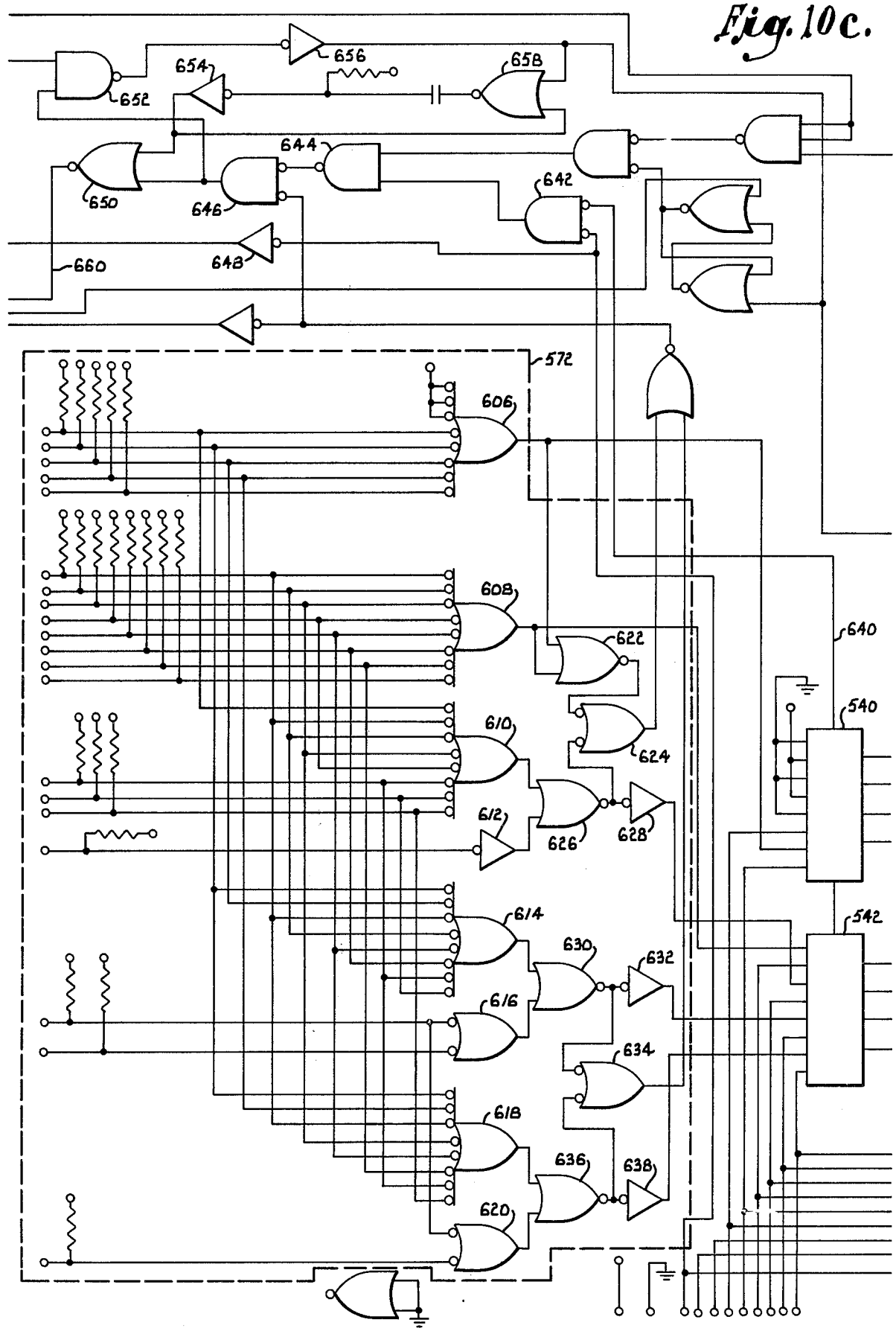
Figure 10D:
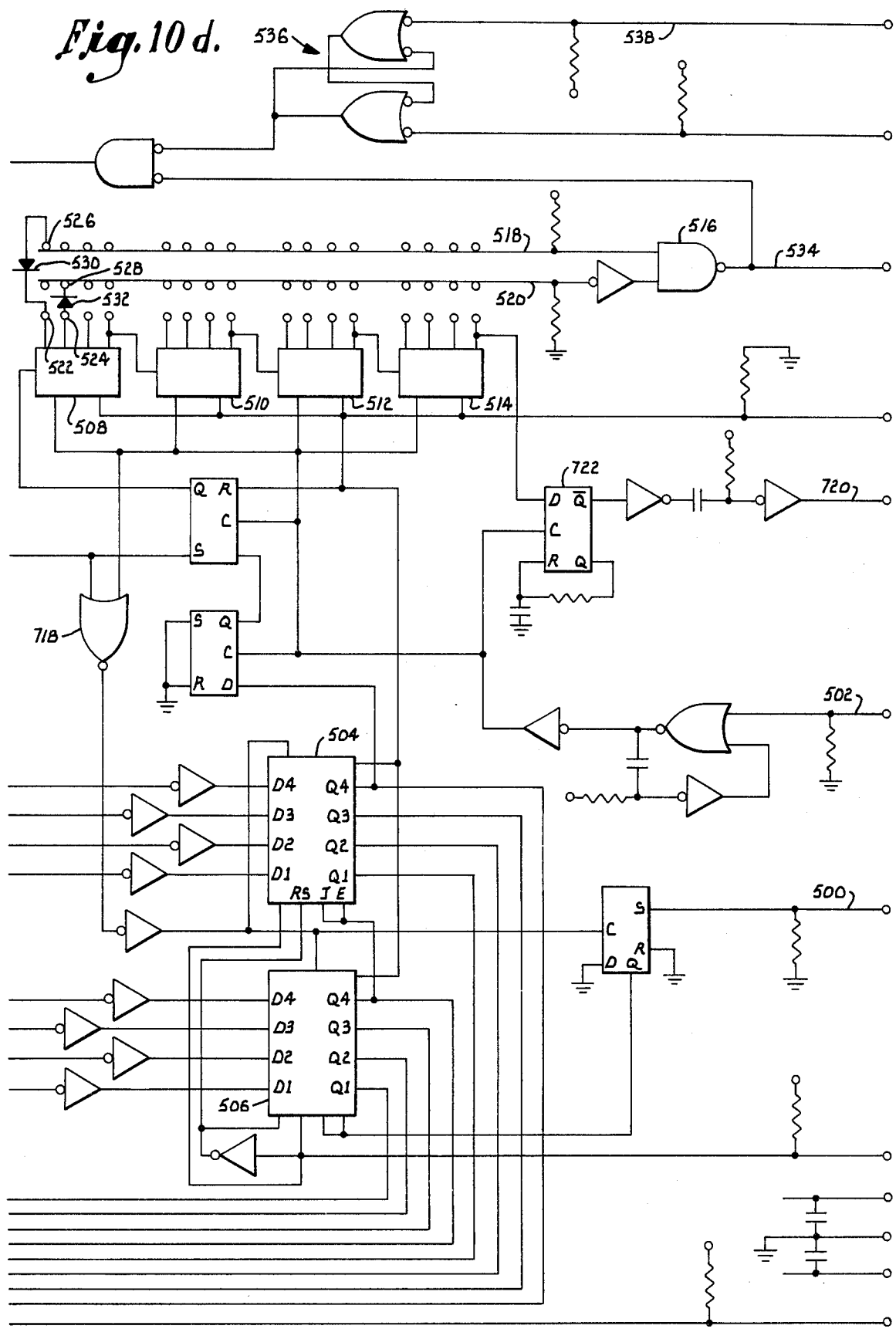

The validity of the stored security code is checked by means of logic gate 516. This gate has two input lines 518 and 520. Each of these input lines contains sixteen tie points which correspond to the sixteen outputs of the security code storage register. Two of these storage register outputs are designated by the numerals 522 and 524, while two of the tie points are designated by the numerals 526 and 528. The security code outputs are tied to the appropriate tie point by means of diodes which are arranged to represent particular logic values. As shown in FIG. 10D, output 522 represents a logic level one with this output being tied to tie point 526 by means of diode 530. A logic level zero tie in, on the other hand, is shown at output 524 with this output being tied to tie point 528 by means of diode 532. Each of the remaining outputs is similarly tied to its corresponding tie point on conductor lines 518 or 520 depending upon the preselected logic value of these terminals.

If the output at terminal 522 is a logic one, the positive voltage signal present at this output inhibits current flow through diode 530 thereby maintaining conductor line 518 at its appropriate voltage level. A low voltage signal at this output, on the other hand, allows current to flow through diode 530 causing conductor line 518 to go low. If conductor line 518 is low, logic gate 516 is disabled indicating that the checked security code is invalid. Similarly, a zero output at terminal 524 will maintain logic line 520 at its appropriate logic level to enable logic gate 516. However, a positive signal at terminal 524 drives conductor line 520 high thereby providing an improper logic level signal to logic gate 516 through inverter 525. When the security code stored in registers 508, 510, 512 and 514 corresponds with the security code programmed in the vending machine control circuit by means of the above described diode tie-in arrangement, the output at 534 of logic gate 516 is a low level logic signal which represents a valid security code. Output line 534 is electrically connected to the security code false line of FIG. 8.

The clock pulses generated during the erasing operation are provided to flip-flop 536 via the erase input line 538. This flip-flop senses the presence of clock pulses during the erasing operation to ensure that the data on the card is actually being erased.

Once the security code has been checked and the recorded data erased, the vending operation is initiated. The vending operation includes comparing the price of the selected items with the balance from the magnetic stripe card, dispensing the item if the price of the selected item is less than or equal to the recorded balance, subtracting the price of the item from the recorded balance, and generating data indicative of the new balance upon closure of the customer return switch 450 (FIG. 2).

Arithmetic circuits 540 and 542 are provided to compare the price of the selected item with the recorded balance stored in storage registers 504 and 506 and to dispense the item if the price of the selected item is, in fact, less than or equal to the recorded balance. Price information is provided to arithmetic circuits 540 and 542 for comparison with the recorded balance by means of selection buttons 544, 546, 548, 550, 552, 554, 556, and 558, opto couplers 560, 562, 564 and 566, storage registers 568 and 570, and the price matrix generally designated by the numeral 572. The opto couplers are light couplers which transform a light signal into an electrical signal representative of the selection button being activated. By using opto couplers, isolation of the high voltage vending machine apparatus and low voltage vending machine control circuitry can be maintained in order to eliminate the need for a common ground which can cause high voltage spike problems in the low voltage control circuitry.

Opto couplers 560 and 562 are electrically connected to storage register 568 by means of logic gates 574, 576, 578 and 580, while opto couplers 564 and 566 are electrically connected to storage register 570 through logic gates 582, 584, 586 and 588. The selection signal from a particular opto coupler is transmitted through its corresponding logic gate to the appropriate storage register where this information is stored for the duration of the vending operation. This storage register then changes the logic state of one of its output pins (storage register 568 includes output pins 590, 592, 594 and 596 while storage register 570 includes output pins 598, 600, 602 and 604) in response to the selection signal provided to the storage register. Each output pin corresponds to a different selection button so that activation of a particular selection button causes a specific output pin to change its logic level.

The price code representative of the price of the selected item is generated in price matrix 592. The price matrix is comprised of logic gates 606, 608, 610, 612, 614, 616, 618, 620, 622, 624, 626, 628, 630, 632, 634, 636 and 638 which are electrically interconnected to provide a binary signal representative of the price of the selected item. The price code is generated by connecting the output pins of storage registers 568 and 570 to the appropriate matrix inputs by means of jumper wires not shown in these figures. Each input pin represents a different monetary value so that connection of each output pin to a selected combination of matrix inputs generates a price code representative of the price of the selected item. The generated price code is then provided to arithmetic circuits 540 and 542 where it is compared with the balance stored in storage registers 504 and 506.

If the recorded balance exceeds or equals the price of the selected item, arithmetic circuit 540 changes the logic level of carry line 640 indicating that the selected item may be dispensed. The carry line acts as one of the inputs to logic gate 642 which, in combination with logic gates 644, 646, 648, 650, 652, 654, 656 and 658 performs a number of checks prior to dispensing the slected item. These checks are made to ensure that all of the conditions precedent to vending an item are satisfied including: 1. is the recorded balance sufficient to cover the price of the selected item; 2. is the security code intact; 3. has the magnetic stripe card been erased; and 4. is the selected item in the machine or has it been sold out. If all of these conditions are satisfied, the dispense line 660 is activated.

Activation of the dispense line 660 in turn activates the appropriate relay solenoid 662, 664, 666, 668, 670, 672, 674 or 676 to turn on the vending machine and dispense the selected item. Dispense line 660 acts as one of the inputs to logic gates 674, 680, 682, 684, 688, 690 and 692. The other input of each of these logic gates is connected to a different output line of storage registers 568 and 570. In this way, the logic gate is enabled when dispense line 660 and its corresponding storage register output line is of the appropriate logic level. The output of these logic gates are electrically connected to switching transistors 694, 696, 698, 700, 702, 704, 706 and 708 which are connected in series with the above mentioned vend solenoids. In this way, only the gate corresponding to the selection button activated is enabled thereby activating the appropriate vend relay and causing the selected item to be dispensed.

Upon dispensing the selected item, the vending machine provides an activation signal to flip-flop 702 indicating that the selected item has in fact been dispensed. Setting this flip-flop causes a subtract signal to be provided on conductor line 714. The subtract signal is then provided to storage registers 504 and 506 via logic gates 716, 652, 656 and 718. Upon receipt of a subtract signal, storage registers 504 and 506 subtract the price stored in the arithmetic unit from the recorded balance stored in storage registers 504 and 506 and stores the resultant balance in these registers. Storage registers 568 and 570 are then reset and the vending machine control circuit is now ready to vend a second item or to reprogram and return the magnetic stripe card. The vending operation is once again initiated upon closure of a particular selection button. Closure of the customer return switch 450 shown in FIG. 8, however, activates the return operation. The return operation includes recording the security code and new balance onto the magnetic stripe card.

The return operation is initiated by activating the head drive motor in a forward run direction. As the magnetic head detects and reproduces stored clock pulses, the security code stored in registers 508, 510, 512 and 514 and the new balance stored in registers 504 and 506 is provided at the data out terminal 720 for reproduction on the magnetic stripe card. Flip-flop 722 is provided to delay the data pulses so that they will occur in the interval between clock pulses rather than coincident with a detected clock pulse. The data outline 720 is connected to the data outline of the interface circuit shown in FIG. 8 and causes the write circuitry to record data onto the magnetic stripe card.

A basic display circuit capable of displaying the balance stored on the magnetic stripe card is shown in FIG. 11. This circuit accepts a binary signal representative of the balance stored in storage registers 504 and 506 at inputs 800, 802, 804, 806, 810 and 812. The inputted binary code is then provided to decoders 814, 816 and 818 which drive the display circuits 820, 822, 824 and 826. This vending machine circuit displays the original balance recorded on the magnetic stripe card and the resultant balance upon completion of the vending operation.

From the foregoing, it will be seen that this invention is one will adapted to attain all of the ends and objects herein set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A magnetic stripe card reader/writer apparatus for use as the point of sales input medium in a vending machine, said apparatus comprising:
    a card intake channel arranged to receive a magnetic stripe card having a keyed portion establishing a set input orientation, said card intake channel cooperating with the keyed portion of said card to allow for full insertion of said card in only one manner;
    means for locking a fully inserted card in a stationary position within said card intake channel;
    a read/write head selectively operable to record data onto said card and to reproduce data recorded on said card;
    a sensor arm having said read/write head mounted thereon;
    a head drive motor having a drive shaft coupled with said sensor arm in spaced apart relationship from said read/write head, said head drive motor being operable to run in a forward direction wherein said drive shaft is made to rotate about its center axis in one direction and a reverse direction wherein said drive shaft is made to rotate about its center axis in a reverse direction;
    means for producing a lock signal whenever a magnetic stripe card is locked in place within said card intake channel;
    means for causing said head drive motor to run in said forward direction in response to the production of a lock signal to thereby cause said read/write head to move in an arcuate path over the magnetic stripe card locked in place within said card intake channel;
    first switching means for monitoring the forward movement of said sensor arm, said first switch means being operable to produce a return signal whenever said sensor arm reaches a first set point;
    means for causing said head drive motor to run in said reverse direction in response to the production of said return signal to thereby cause said read/write head to move in an arcuate path over the magnetic stripe card locked in place within said card intake slot in a reverse direction;
    second switch means for monitoring the reverse movement of said sensor arm, said second switch means being operable to generate a stop signal whenever the sensor arm reaches a second set point; and
    means for inhibiting said head drive motor from running in said reverse direction in response to the generation of said stop signal.

2. The magnetic stripe card reader/writer apparatus in claim 1 wherein said means for locking a fully inserted card in a stationary position with said card intake channel is comprised of
    a locking arm having a lock position and an open position, said locking arm being arranged to secure a fully inserted card in place within said card intake channel when said locking arm is in said lock position and to allow free movement of a card within said card in the channel when said locking arm is in said open position; and
    means for controlling the position of said locking arm in response to the condition of a card in said card intake channel.

3. The invention in claim 2 wherein said locking means includes means for placing said locking arm in said lock position if operating power is not being provided to the apparatus thereby preventing a magnetic card from being inserted into said receiving means.

4. The invention in claim 2 wherein said locking arm includes a locking pin which is arranged to pass through a hole in a fully inserted card when the locking arm is in said lock position.

5. The invention in claim 2 wherein said means for controlling the position of said locking arm is comprised of
    a lock solenoid having a plunger assembly coupled with said locking arm, said lock solenoid having a lock condition wherein said locking arm is maintained in said lock position and an open condition wherein said locking arm is maintained in said open position, and
    a card-in switch means for controlling the condition of said lock solenoid, said card-in switch means having an open switch state wherein said lock solenoid is maintained in said open condition and a lock switch state wherein said lock solenoid is maintained in said lock condition, said card-in switch means being biased towards said open switch state thereby maintaining said lock solenoid in said open condition, said card-in switch means being further arranged to be engaged and switched to said lock switch state by a card fully inserted within said card intake channel thereby initiating the lock condition of said lock solenoid.

6. The invention in claim 1 including electronic means for selectively operating said read/write head, said circuit means having a read mode enabling said read/write head to record data onto the card and a write mode for enabling said read/write head to reproduce data recorded on the card.

7. The magnetic stripe card reader/writer apparatus as in claim 1 including means for placing said read/write head in condition to erase the date stored on a magnetic stripe card whenever said head drive motor is running in said reverse direction.

8. The magnetic stripe card reader/writer apparatus as in claim 1 including means for inhibiting the recording and reproducing operation of said read/write head unless a lock signal is being produced.

9. A magnetic stripe card reader/writer device for recording data onto a corresponding magnetic stripe card and for reproducing data previously recorded onto said card, said card being equipped with a locking hole and having a physical configuration which provides a keyed portion that establishes a set input orientation, said card reader/writer device comprising:

a card intake channel wherein a portion of the channel conforms to the keyed portion of said card to allow said card to be fully inserted into said channel in only one manner;

a locking arm with a locking pin protruding outward therefrom, said locking arm being capable of moving between a locked position wherein said locking pin intercepts said card intake channel so as to engage the locking hole in a fully inserted card to thereby secure the inserted card in a stationary position within the card intake channel and an open position wherein said locking pin does not intersect said card intake channel to thereby allow free movement of a card within the card intake channel;

a lock solenoid having a plunger assembly coupled with said locking arm, said lock solenoid having a lock condition wherein said locking arm is maintained in said lock position and an open condition wherein said locking arm is maintained in said open position, said lock solenoid being operable to assume said open condition in response to the passage of an electrical power signal through said lock solenoid and said lock condition when an electrical power signal is not passing through said lock solenoid;

switch means for interrupting the passage of said electrical power signal through said lock solenoid whenever a card is fully inserted within said card intake channel;

a read/write head selectively operable to record data onto said card and to reproduce data recorded on said card;

means for moving said read/write head over said magnetic card; and control means for monitoring the position of said locking arm, said control means being operable to inhibit the recording and reproduction operation of said read/write head if said locking arm is not in said lock position.

10. The magnetic stripe card reader/writer device as in claim 9 wherein said control means includes means for producing a lock signal whenever said locking arm is in a lock position.

11. The magnetic stripe card reader/writer device as in claim 9 including:

a sensor arm having said read/write head mounted thereon;

a head drive motor having a drive shaft coupled with said sensor arm in spaced apart relationship from said read/write head, said head drive motor being operable to run in a forward direction wherein said drive shaft is made to rotate about its center axis in one direction and a reverse direction wherein said drive shaft is made to rotate about its center axis in a reverse direction;

means for causing said head drive motor to run in said forward direction in response to the production of a lock signal to thereby cause said read/write head to move in an arcuate path over the magnetic stripe card locked in place within said card intake channel;

first switching means for monitoring the forward movement of said sensor arm, said first switch means being operable to produce a return signal whenever said sensor arm reaches a first set point;

means for causing said head drive motor to run in said reverse direction in response to the production of said return signal to thereby cause said read/write head to move in an arcuate path over the magnetic stripe card locked in place within said card intake slot;

second switch means for monitoring the reverse movement of said sensor arm, said second switch means being operable to generate a stop signal whenever the sensor arm reaches a second set point; and means for inhibiting said head drive motor from running in said reverse direction in response to the generation of said stop signal.

* * * * *